H. P. WHEELER.
Improvement in Weighing-Scales.
No. 114,737.
Patented May 9, 1871.
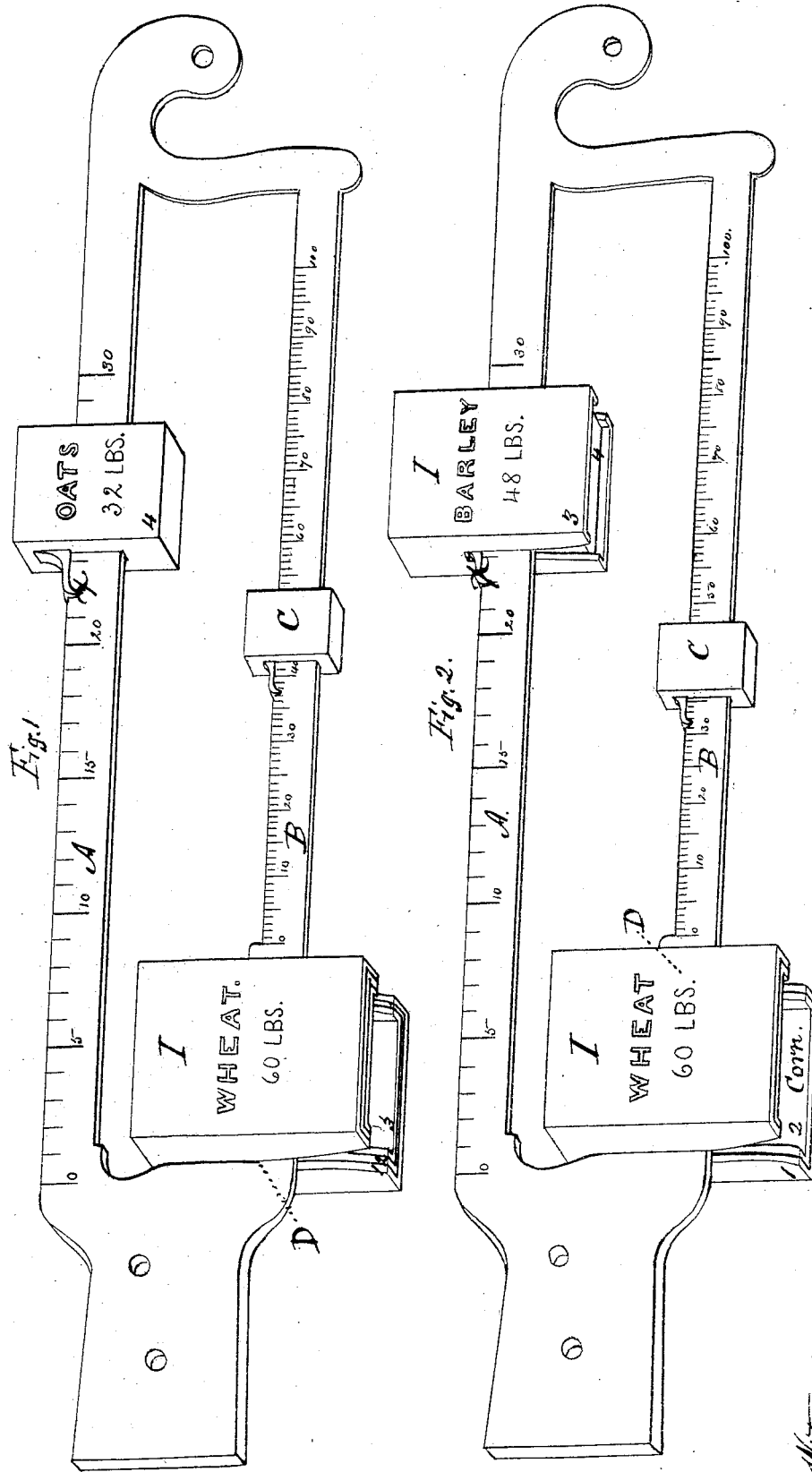

UNITED STATES PATENT OFFICE.

HARLAN P. WHEELER, OF ROCHESTER, NEW YORK.

IMPROVEMENT IN WEIGHING-SCALES.

Specification forming part of Letters Patent No. 114,737, dated May 9, 1871.

*To all whom it may concern:*

Be it known that I, HARLAN P. WHEELER, of Rochester, in Monroe county, in the State of New York, have invented new and useful Improvements in Weighing-Scales; and I do hereby declare that the following is a full and exact description thereof, reference being had to the accompanying drawing and to the letters of reference marked thereon.

Figure 1 represents a side elevation of my scale-beams and poises. Fig. 2 is a similar view of the same with a different adjustment of the poises.

The leading object of my invention is to furnish a scale with a series of poises, which, during all the different operations of weighing, shall not only remain upon the scale-beams and serve as a balance, but which shall be capable of such divisions and adjustments as will enable the several sections or divisions to be used jointly and in divisions, for weighing different kinds of grain or other articles, and determining the quantity in integrals of bushels and the like, with the use of a beam provided with a single scale of figures; and in combination with such a scale-beam and poises I use a second scale-beam for weighing the fractions of bushels or pounds. By this construction and arrangement of poises I avoid the use of a great number of beams, each of which would have to be provided with a separate poise, which construction would superadd so much weight to be supported upon the fulcrum of the beam as to prevent the perfect working of the scales.

In the drawing, Figs. 1 and 2 each represent the two scale-beams with the properly-graduated scales of figures. Beam A is graduated for weighing grain in bushels, and is provided with a series of poises, each one of which sections is furnished with the name and number of pounds per bushel of the particular kind of grain which it is designed to be used to weigh. The auxiliary beam B is furnished with the single poise C, and is properly graduated for weighing pounds, and at the inner end of the beam B, nearest to the fulcrum of the scales, a seat, D, is provided of just sufficient extent to receive one or more of the movable sections of the poise or poises which are used upon the beam A for weighing bushels. The seat D, it will be seen, occupies a position in the same relation laterally to the fulcrum of the scales which is occupied by the poises when they are upon the beam A, and the finger *x* of the poise is adjusted to the cipher at the inner end of that beam, and, consequently, the beams are kept balanced by the poises during the various operations of weighing quantities of the smaller denominations.

In my present organization of the parts I have constructed the poises in cup-formed sections, so as to fit upon each other, and in weighing a given article the larger section includes all the sections of less denomination. These sections are represented at I I, and numbered from 1 to 3, the smaller one being of proper dimensions to closely fit over the poise 4, marked "oats, 32 lb." The sectional cup-formed poises are bifurcated, so as to be saddled upon the seat D when not in use for weighing; also that they may fit upon the poise 4 and slide over the beam A when in use for weighing. The indicator *x* is attached to the poise 4 and slides with the poise along the edge of beam A, to denote the quantity weighed.

It will be readily understood that the divisible poise which I employ in my present construction may be made in various forms, which will accomplish the objects of my invention, the governing rule being always observed to have the seat of the poises upon the beam determined and fixed, so that no inaccuracy of position could occur.

From the foregoing description it will be observed that when my invention is applied to use, with the particular number and construction of poises represented in the drawing, that the poise 4 will alone be used to indicate in bushels the weight of oats, and the three sections 1 2 3 will in the mean time rest upon seat D; but in weighing any number of bushels of barley, corn, or wheat the several poises or sections of less denomination than the one marked with the kind of grain being weighed will be included; in other words, the weight of the larger poise is made up of its own gravity and that of all the smaller sections, always including number 4. The use of several indivisible poises, each marked with the denomination or kind of grain or other commodity of a designated standard of weight, may be used upon the scale-beam with a single scale of figures, when a suitable adjustable balance for the scale-beam is employed.

Having fully described my invention, I claim and desire to secure by Letters Patent—

1. The sectional and slotted poises 1 2 3 4, constructed to fit each other in a nest form, and to be used either in divisions or jointly upon the principal scale-beam A, according to the standard of the substance to be weighed, substantially as described.

2. The adaptation of the sectional and slotted poises to the seat D of the subordinate scale-beam B, so as to form a constant balance for the scale, accordingly as the several divisions are not in use for weighing, substantially as described.

In testimony whereof I have hereunto set my hand this 21st day of February, 1871.

HARLAN P. WHEELER.

Witnesses:
  H. P. K. PECK,
  G. W. KENTZ.